US008869610B2

(12) United States Patent
Liu

(10) Patent No.: US 8,869,610 B2
(45) Date of Patent: Oct. 28, 2014

(54) FUEL LEVEL GAUGE CONTROL SYSTEMS AND METHODS

(75) Inventor: Eden Liu, Novi, MI (US)

(73) Assignee: GM Global Technology Operations LLC

( * ) Notice: Subject to any disclaimer, the term of this patent is extended or adjusted under 35 U.S.C. 154(b) by 504 days.

(21) Appl. No.: 13/177,864

(22) Filed: Jul. 7, 2011

(65) Prior Publication Data

US 2012/0285238 A1    Nov. 15, 2012

Related U.S. Application Data

(60) Provisional application No. 61/485,343, filed on May 12, 2011.

(51) Int. Cl.
*G01F 23/00*  (2006.01)
*F02M 25/08*  (2006.01)
*B60K 15/03*  (2006.01)

(52) U.S. Cl.
CPC .............. *B60K 15/03* (2013.01); *F02M 25/08* (2013.01); *B60K 2015/03361* (2013.01); *B60K 2015/03217* (2013.01)
USPC ........................................................ 73/290 R

(58) Field of Classification Search
USPC ........................................................ 73/290 R
See application file for complete search history.

(56) References Cited

U.S. PATENT DOCUMENTS 4,611,287 A * 9/1986 Kobayashi et al. ........... 701/123
5,542,394 A * 8/1996 Tomisawa ..................... 123/491

* cited by examiner

*Primary Examiner* — Hezron E Williams
*Assistant Examiner* — Mark A Shabman

(57) ABSTRACT

A system includes a fuel level determination module, an adjusting module, and a gauge control module. The fuel level determination module outputs a measured fuel level based on a fuel level signal generated by a fuel level sensor. After an ignition system of the vehicle is turned on, the adjusting module adjusts a present fuel level toward the measured fuel level based on a first rate when a refueling event was detected while the ignition system was off and adjusts the present fuel level toward the measured fuel level based on a second rate when a refueling event was not detected while the ignition system was off. The first rate is faster than the second rate. The gauge control module controls a fuel level gauge to display the present fuel level.

9 Claims, 4 Drawing Sheets

FUEL LEVEL GAUGE CONTROL SYSTEMS AND METHODS

CROSS-REFERENCE TO RELATED APPLICATIONS

This application claims the benefit of U.S. Provisional Application No. 61/485,343, filed on May 12, 2011. The disclosure of the above application is incorporated herein by reference in its entirety.

FIELD

The present application relates to vehicles with internal combustion engines and more particularly to fuel gauge control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust a mixture of air and fuel to generate torque. The fuel of the air/fuel mixture may be liquid fuel and/or vapor fuel. A fuel system is used to supply liquid fuel and/or vapor fuel to the engine. Liquid fuel is drawn from a fuel tank. A low pressure fuel pump may draw liquid fuel from the fuel tank. The low pressure fuel pump may provide liquid fuel to a high pressure fuel pump or to a fuel injector. Vapor fuel is drawn from a vapor canister of a purge system.

Generally, liquid fuel is contained within the fuel tank. In some circumstances, the liquid fuel may vaporize and form vapor fuel. The vapor canister stores the vapor fuel. The purge system also includes a purge valve and a vent valve (i.e., a diurnal valve). Operation of the engine causes a vacuum (low pressure relative to barometric pressure) to form within an intake manifold of the engine. Selective actuation of the purge valve and the vent valve allows the vapor fuel to be drawn into the intake manifold, thereby purging the vapor fuel from the vapor canister.

SUMMARY

A system includes a fuel level determination module, an adjusting module, and a gauge control module. The fuel level determination module outputs a measured fuel level based on a fuel level signal generated by a fuel level sensor. After an ignition system of the vehicle is turned on, the adjusting module adjusts a present fuel level toward the measured fuel level based on a first rate when a refueling event was detected while the ignition system was off and adjusts the present fuel level toward the measured fuel level based on a second rate when a refueling event was not detected while the ignition system was off. The first rate is faster than the second rate. The gauge control module controls a fuel level gauge to display the present fuel level.

A method includes: outputting a measured fuel level based on a fuel level signal generated by a fuel level sensor; after an ignition system of the vehicle is turned on, adjusting a present fuel level toward the measured fuel level based on a first rate when a refueling event was detected while the ignition system was off and adjusting the present fuel level toward the measured fuel level based on a second rate when a refueling event was not detected while the ignition system was off; and controlling a fuel level gauge to display the present fuel level. The first rate is faster than the second rate.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
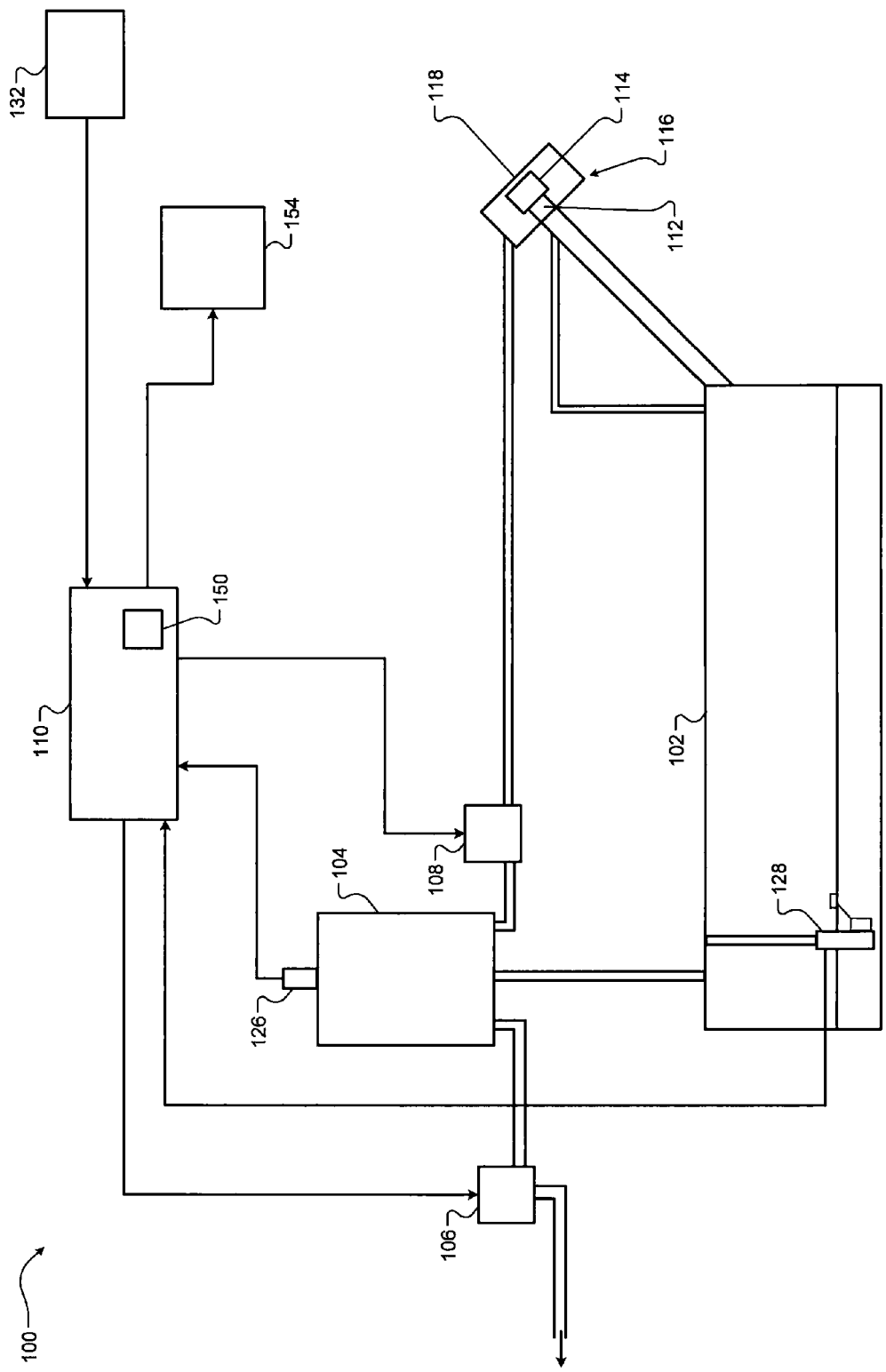
FIG. 1 is a functional block diagram of an example fuel system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

An engine combusts an air/fuel mixture to produce drive torque for a vehicle. Liquid fuel and vapor fuel are drawn from a fuel tank and selectively supplied to the engine. A fuel level sensor measures a level of liquid fuel within the fuel tank. A fuel level gauge displays a present level of fuel within the fuel tank.

A control module generates a present fuel level and controls the fuel level gauge to display the present fuel level. The control module determines the present fuel level based on the measured fuel level and a previous (e.g., last) value of the present fuel level (previous fuel level). More specifically, the control module adjusts the present fuel level toward the measured fuel level based on a difference between the measured fuel level and the previous fuel level.

Under some circumstances, however, the difference between the measured fuel level and the previous fuel level may be large. For example only, the difference may be large for a period after the vehicle is parked on a hill due to movement of liquid fuel within the fuel tank. If the control module adjusts the present fuel level toward the measured fuel level at too fast a rate, the fuel level gauge may display a fuel level that is greater than or less than the actual fuel level because of the hill. For another example only, the difference between the measured fuel level and the previous fuel level may also be large when a refueling event occurs while the vehicle is shut down.

The control module of the present disclosure detects when a refueling event occurs while the vehicle is shut down. When the vehicle is later started, the control module determines a rate for adjusting the present fuel level toward the measured fuel level based on whether a refueling event was detected while the vehicle was shut down. If a refueling event was detected while the vehicle was shut down, the control module adjusts the present fuel level toward the measured fuel level based on a first predetermined rate. The control module adjusts the present fuel level toward the measured fuel level based on a second predetermined rate when a refueling event was not detected while the vehicle was shut down. The first predetermined rate is faster than the second predetermined rate.

In this manner, the control module adjusts the fuel level displayed via the fuel level gauge toward the measured fuel level at a faster rate when a refueling event was detected while the vehicle was shut down. The control module adjusts the fuel level displayed via the fuel level gauge toward the measured fuel level at a slower rate when a refueling event was not detected while the vehicle was shut down.

Referring now to FIG. 1, a functional block diagram of an example fuel system 100 is presented. A vehicle includes an internal combustion engine (not shown) that generates torque. For example only, the engine may be a gasoline-type engine, a diesel-type engine, and/or another suitable type of engine. The engine combusts a mixture of air and fuel within one or more cylinders of the engine to generate torque.

In some vehicles, torque generated by the engine may be used to propel the vehicle. More specifically, torque output by the engine is transferred to a transmission, which may then transfer torque to one or more wheels of the vehicle. In other vehicles, such as some types of hybrid vehicles, torque output by the engine may not be transferred to the transmission. Instead, torque output by the engine may be converted into electrical energy by, for example, a generator. The electrical energy may be provided to one or more electric motors and/or an energy storage device. The one or more electric motors use electrical energy to generate torque to propel the vehicle. Some hybrid vehicles may also receive electrical energy from an alternating current (AC) power source, such as a standard wall outlet.

The fuel system 100 supplies fuel to an engine (not shown). The fuel includes liquid fuel and vapor fuel. The fuel system 100 includes a fuel tank 102 that contains liquid fuel. Some conditions, such as heat, vibration, and/or radiation, may cause liquid fuel within the fuel tank 102 to vaporize. A canister 104 traps and stores vaporized fuel (i.e., vapor fuel). For example only, the canister 104 may include one or more substances, such as a charcoal substance, which absorbs and stores vapor fuel.

Operation of the engine creates a vacuum within an intake manifold of the engine. A purge valve 106 and a vent valve 108 may be selectively operated (e.g., opened and closed) to draw vapor fuel from the canister 104 to the intake manifold for combustion. In other words, operation of the purge valve 106 and the vent valve 108 may be coordinated to purge vapor fuel from the canister 104. An engine control module (ECM) 110 may control the operation of the purge valve 106 and the vent valve 108.

At a given time, the purge valve 106 may be in an open position or a closed position. At the given time, the vent valve 108 may too be in an open position or a closed position. The ECM 110 may allow ambient airflow into the canister 104 by commanding the vent valve 108 to the open position. When the vent valve 108 is in the open position, the ECM 110 may command the purge valve 106 to the open position to purge vapor fuel from the canister 104 to the intake manifold. The ECM 110 may control the rate at which vapor fuel is purged from the canister 104 (i.e., a purge rate) by adjusting how long the purge valve 106 is in the open position during a period of time (i.e., a purge valve duty cycle).

Vacuum within the intake manifold draws vapor fuel from the canister 104 to the intake manifold via the purge valve 106. Vapor fuel drawn from the canister 104 may be replaced by air at ambient (barometric) pressure drawn through the vent valve 108. The purge rate may be based on the duty cycle of the purge valve 106 and the amount of vapor fuel within the canister 104.

The ECM 110 commands the vent valve 108 to the open position and controls the duty cycle of the purge valve 106 during operation of the engine. When the engine is shut down (e.g., at key OFF), the ECM 110 commands both the purge valve 106 and the vent valve 108 to their respective closed positions. The purge valve 106 and the vent valve 108 are maintained in their respective closed positions when the engine is OFF.

Liquid fuel may be added to the fuel tank 102 via a fuel inlet 112. A fuel cap 114 closes the fuel inlet 112 and the fuel tank 102. The fuel cap 114 and the fuel inlet 112 may be accessed via a fueling compartment 116. A fuel door 118 closes the fueling compartment 116. In various implementations, the ambient air provided to the canister 104 through the vent valve 108 may be drawn from the fueling compartment 116.

A vacuum may naturally form within the fuel tank 102 after the engine is shut down. The vacuum may be attributable to heating and subsequent cooling of gas (e.g., air and/or vapor fuel) present in the fuel tank 102 and/or the canister 104 after the engine is shut down. The vacuum may be referred to as engine off natural vacuum (EONV).

The ECM 110 may receive various signals. For example only, the ECM 110 receives a tank pressure signal from a tank pressure sensor 126 and a fuel level signal from a fuel level sensor 128. The tank pressure sensor 126 measures pressure within the fuel tank 102 (i.e., a tank pressure) and generates the tank pressure signal based on the pressure. The tank pressure may be measured relative to ambient air pressure in various implementations. While the tank pressure sensor 126 is depicted as being located within the canister 104, the tank pressure sensor 126 may be located in another suitable location, such as within the fuel tank 102.

The fuel level sensor 128 measures an amount of liquid fuel in the fuel tank 102 (i.e., a fuel level) and generates the fuel level signal based on the amount. The fuel level may be in terms of a volume, a percentage of a maximum volume of the fuel tank 102, or another suitable measure of the amount of fuel in the fuel tank 102. The fuel level sensor 128 may include, for example, a float, a capacitive fuel level sensor, or another suitable type of fuel level sensor.

In various implementations, the fuel tank 102 may include two or more individual but connected fuel compartments. One fuel level sensor may be provided for each of the individual fuel compartments. The fuel level to be displayed may be determined based on the signals generated by the fuel level sensors.

An ignition module 132 may include an ignition switch or button (not shown) that can be manipulated to start and shut down the vehicle. For ease of discussion only, the ignition module 132 will be discussed as including an ignition switch. The ignition switch may have multiple positions, such as an OFF position, an ON position, and a CRANK position. The ignition switch may output an ignition signal that indicates the ignition switch position. The ECM 110 may control the engine based on the ignition signal. For example only, the ECM 110 may start the engine, shut down the engine, and allow the engine to run when the ignition signal indicates the CRANK position, the OFF position, and the ON position, respectively.

The ECM 110 may include a display control module 150. The display control module 150 controls a fuel level gauge 154 implemented within a passenger cabin of the vehicle to display a present fuel level. The display control module 150 sets the present fuel level based on the fuel level signal provided by the fuel level sensor 128 (measured fuel level).

The fuel level gauge 154 may include, for example, a digital fuel gauge, an electro-mechanical fuel gauge, or another suitable type of fuel level gauge. A digital fuel gauge may include, for example, a bar display that displays discrete fuel levels between empty and full, a numeric display that displays, for example, a volume of fuel or a percentage between empty and full, or another suitable digital fuel gauge. An electro-mechanical fuel gauge may include, for example, a needle that is positioned between empty and full to indicate a present fuel level or another suitable type of electro-mechanical fuel gauge. The needle may be positioned, for example, via an electric motor, such as a stepper motor.

When the vehicle is shut down (i.e., at key OFF), the display control module 150 stores the present fuel level displayed. When the vehicle is later started (i.e., at key ON), the display control module 150 begins adjusting the displayed fuel level toward the measured fuel level.

However, the fuel level indicated by the fuel level sensor 128 may change while the vehicle is shut down under some circumstances. For an example only, the fuel level indicated by the fuel level sensor 128 may increase when fuel is added to the fuel tank 102 while the vehicle is shut down. For another example only, the fuel level indicated by the fuel level sensor 128 may increase or decrease when the vehicle is parked on a hill. Parking the vehicle on the hill can cause the fuel level signal to indicate that the measured fuel level within the fuel tank 102 is greater than or less than an actual fuel level.

When the vehicle is started and a refueling event was detected while the vehicle was shut down, the display control module 150 adjusts the present fuel level toward the measured fuel level at a first rate. The display control module 150 adjusts the present fuel level toward the measured fuel level at a second rate when the vehicle is started and a refueling event was not detected. The first filtering rate is greater than the second filtering rate.

In this manner, the display control module 150 adjusts the fuel level displayed via the fuel level gauge 154 toward the measured fuel level at a faster rate when a refueling event was detected while the vehicle was shut down. When a refueling event was not detected, the display control module 150 adjusts the fuel level displayed toward the measured fuel level at a slower rate to prevent an inaccurate fuel level (e.g., a fuel level caused by the vehicle being parked on a hill) to be displayed.

Figure 2:
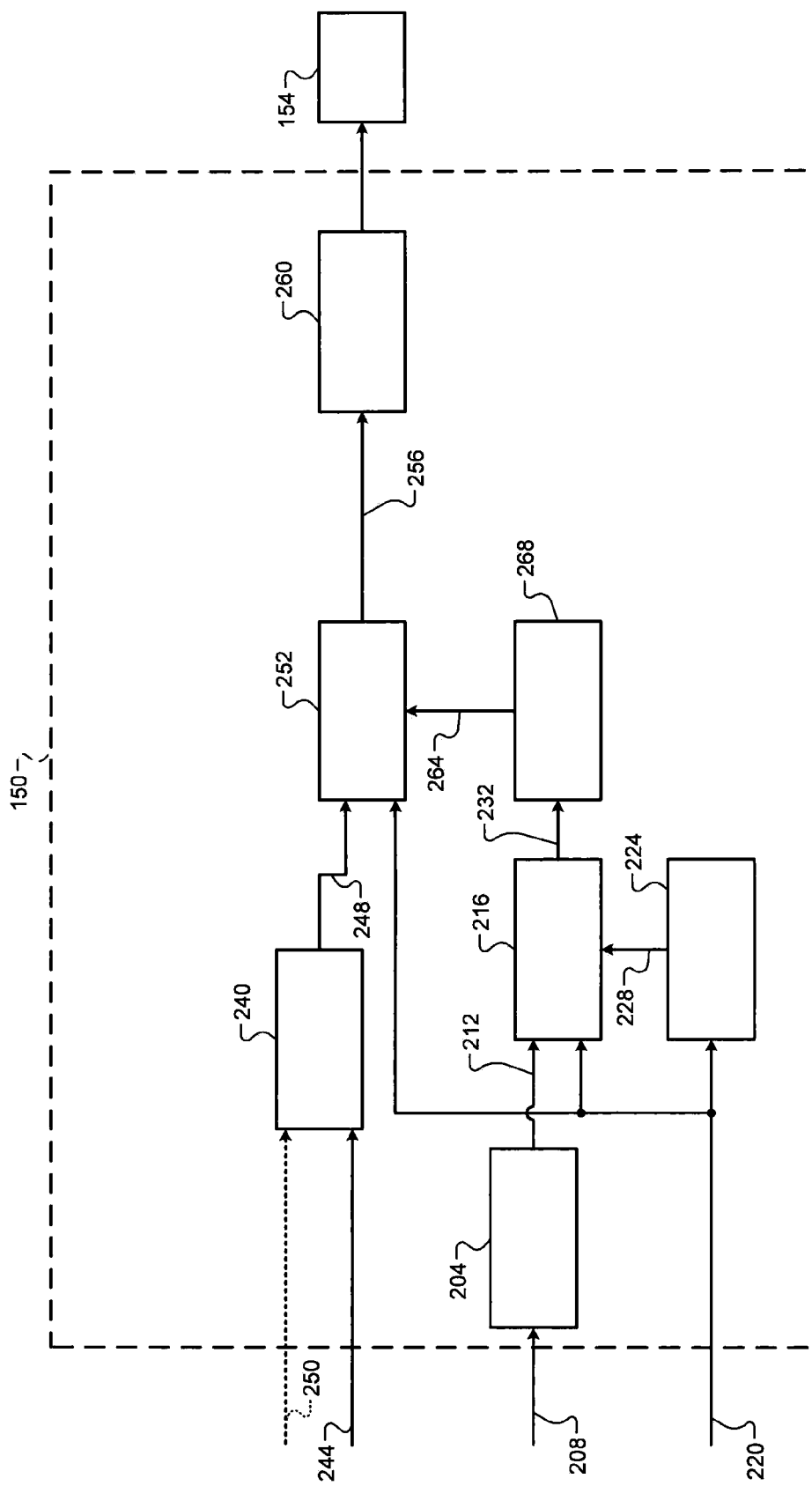
FIG. 2 is a functional block diagram of an example fuel level gauge control system according to the present disclosure.

Referring now to FIG. 2, a functional block diagram of an example fuel level control system is presented. A tank pressure determination module 204 may receive the tank pressure signal 208 from the tank pressure sensor 126. The tank pressure determination module 204 outputs a measured tank pressure 212 based on the tank pressure signal 208. For example only, the measured tank pressure 212 may include a digitized version of the tank pressure signal 208. The tank pressure determination module 204 may sample the tank pressure signal 208 and output the measured tank pressure 212 at a predetermined loop rate.

A refueling detection module 216 monitors the measured tank pressure 212 to detect when a refueling event occurs. In response to the ignition system of the vehicle being turned off (e.g., key OFF), the refueling detection module 216 may store the measured tank pressure 212 as an initial tank pressure. The ignition system of the vehicle being turned off may be indicated by the ignition signal 220.

A timer module 224 initializes a timer value 228 in response to the ignition system of the vehicle being turned off. More specifically, the timer module 224 resets the timer value 228 to a predetermined reset value (e.g., zero) and starts the timer value 228 counting in response to the ignition system of the vehicle being turned off. The timer value 228 therefore tracks the period elapsed since the ignition system of the vehicle was turned off (i.e., key OFF).

The refueling detection module 216 monitors the measured tank pressure 212 for a predetermined period after the ignition system of the vehicle is turned off. More specifically, the refueling detection module 216 monitors the measured tank pressure 212 while the timer value 228 is less than a predetermined value (corresponding to a predetermined period). The predetermined period may be a calibrated value and may be set to, for example only, approximately 10 minutes or another suitable value.

The refueling detection module 216 determines whether a refueling event occurred based on the initial tank pressure and the measured tank pressure 212 during the predetermined period. For example only, the refueling detection module 216 may determine that a refueling event occurred when the measured tank pressure 212 is greater than the initial tank pressure. The refueling detection module 216 may determine that a refueling event occurred when the measured tank pressure 212 is greater than the initial tank pressure by at least a predetermined amount and/or for at least a predetermined period. For example only, the predetermined amount may be approximately 4-5 inches of water or another suitable value. The predetermined amount may be a calibrated value and may vary from vehicle to vehicle.

The refueling detection module 216 may determine a delta tank pressure based on the measured tank pressure 212 minus the initial tank pressure. The refueling detection module 216 may determine that a refueling event occurred when the delta tank pressure is greater than the predetermined amount.

Because both the vent valve 108 and the purge valve 106 are in their respective closed positions when the ignition system of the vehicle is off, the fuel system 100 is closed while the ignition system of the vehicle is off. Thus, the measured tank pressure 212 (and more specifically an increase in the measured tank pressure 212) can be used to detect the occurrence of a refueling event. As the fuel level measured using the fuel level sensor 128 may change based on road grade where the vehicle is parked, the detection of a refueling event can be made independently of the fuel level signal in various implementations.

The refueling detection module 216 may indicate whether a refueling event occurred using a refueling indicator (e.g., signal) 232. For example only, the refueling detection module 216 may set the refueling indicator 232 to an active state when a refueling event has been detected. The refueling detection module 216 may set the refueling indicator 232 to an inactive state when a refueling event has not been detected.

A fuel level determination module 240 receives the fuel level signal 244 from the fuel level sensor 128. The fuel level determination module 240 outputs a measured fuel level 248 based on the fuel level signal 244. For example only, the measured fuel level 248 may include a digitized version of the fuel level signal 244. The fuel level determination module 240 may sample the fuel level signal 244 and output the measured fuel level 248 at a predetermined loop rate.

In implementations with at least one additional fuel level sensor, the fuel level determination module 240 may receive a second fuel level signal 250. The fuel level determination module 240 may generate the measured fuel level 248 based on both the fuel level signal 244 and the second fuel level signal 250.

An adjusting module 252 sets a present fuel level 256 based on the measured fuel level 248. A gauge control module 260 controls the fuel level gauge 154 based on the present fuel level 256. For example only, the gauge control module 260 may control the fuel level gauge 154 such that the present fuel level 256 is displayed via the fuel level gauge 154. The fuel level gauge 154 is visible within a passenger cabin of the vehicle.

The adjusting module 252 sets the present fuel level 256 further based on a selected adjustment parameter 264. More specifically, the adjusting module 252 adjusts the present fuel level 256 toward the measured fuel level 248 based on the selected adjustment parameter 264. The selected adjustment parameter 264 may correspond to a maximum amount for adjusting the present fuel level 256 toward the measured fuel level 248 over each predetermined period. In other words, the selected adjustment parameter 264 may correspond to a rate at which the adjusting module 252 adjusts the present fuel level 256 toward the measured fuel level 248.

The adjusting module 252 may adjust the present fuel level 256 toward the measured fuel level 248 based on the selected adjustment parameter 264 using a filter. For example only, the filter may include a linear first-order filter, and the selected adjustment parameter 264 may be a filter coefficient. For example only, the adjusting module 252 may set the present fuel level 256 equal to a last value of the present fuel level 256 plus a product of the filter coefficient and a difference between the last value of the present fuel level and the present value of the measured fuel level 248. When the vehicle is started, the last value of the present fuel level 256 may be the value of the present fuel level 256 when the vehicle was shut down.

A selection module 268 sets the selected adjustment parameter 264 to one of a first adjustment parameter and a second adjustment parameter based on the refueling indicator 232. The first and second adjustment parameters correspond to first and second predetermined rates, respectively, for adjusting the present fuel level 256 toward the measured fuel level 248. The first and second predetermined rates are different. For example only, as filter coefficients for the first-order lag filter, the first adjustment parameter may be approximately 0.4 and the second adjustment parameter may be approximately 0.0013 or other suitable values. The first and second adjustment parameters may be calibrated values and may vary from vehicle to vehicle.

The selection module 268 sets the selected adjustment parameter 264 to the one of the first and second adjustment parameters that allows for faster adjustment of the present fuel level 256 toward the measured fuel level 248 when the refueling indicator 232 is in the active state. The selection module 268 sets the selected adjustment parameter 264 to the one of the first and second adjustment parameters that allows for slower adjustment of the present fuel level 256 when the refueling indicator is in the inactive state.

In this manner, the adjusting module 252 adjusts the present fuel level 256 toward the measured fuel level 248 at the faster rate when a refueling event is detected. When a refueling event is not detected, the adjusting module 252 adjusts the present fuel level 256 toward the measured fuel level 248 at the slower rate. Accordingly, if the vehicle is started while parked on a hill, for example, where the measured fuel level 248 may be different than the present fuel level 256, the adjusting module 252 only adjusts the fuel level displayed via the fuel level gauge 154 at the slow rate.

When a refueling event is detected and the selection module 268 sets the selected adjustment parameter 264 to the first adjustment parameter, the selection module 268 may selectively later set the selected adjustment parameter 264 to the second adjustment parameter. For example only, the selection module 268 may transition the selected adjustment parameter 264 from the first adjustment parameter to the second adjustment parameter in response to the passing of a predetermined period after the vehicle is started, when the measured fuel level 248 becomes equal to the present fuel level 256 for at least a predetermined period, and/or when one or more other suitable conditions are satisfied.

Figure 3:
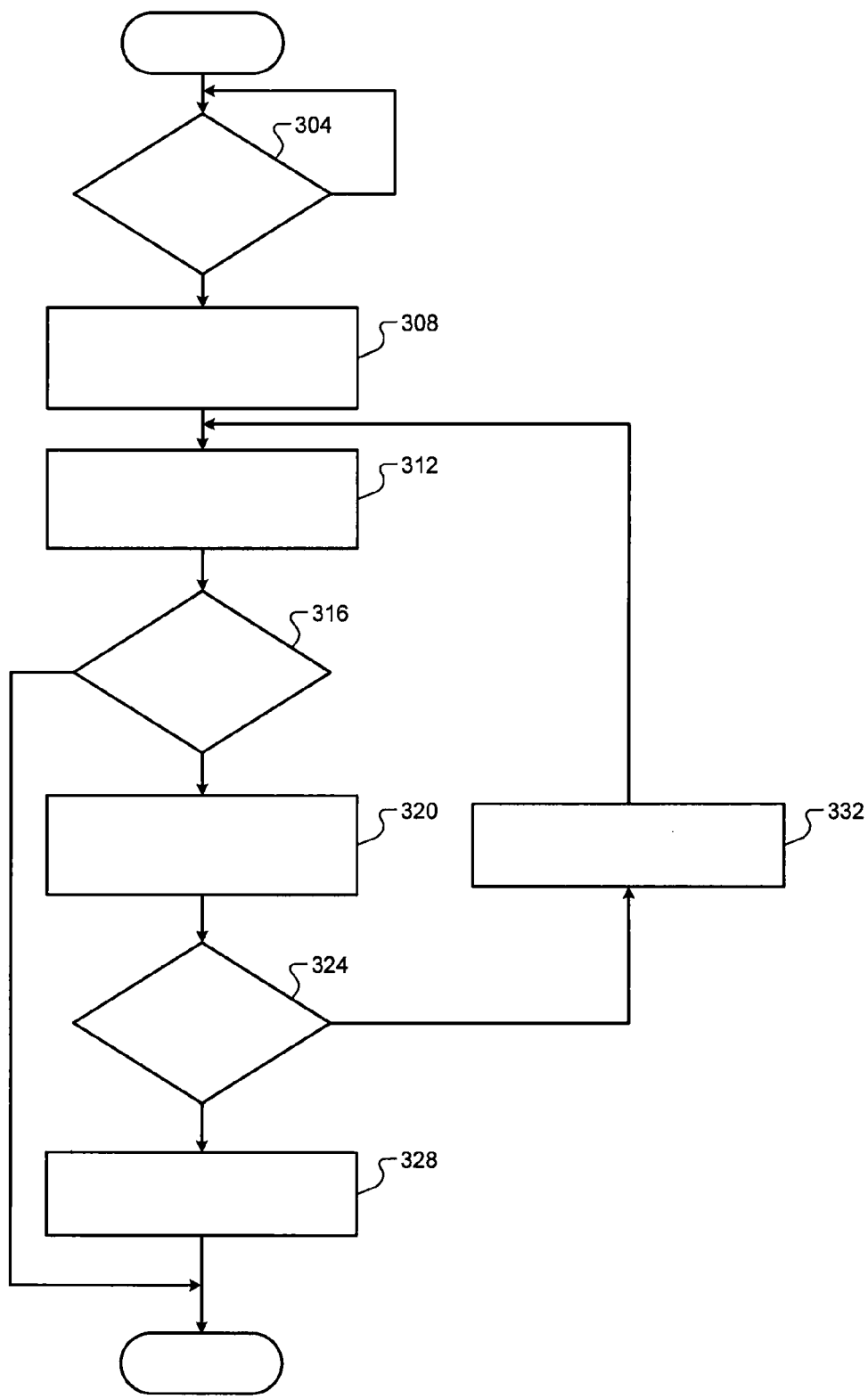
FIG. 3 is a flowchart depicting an example method of detecting a refueling event according to the present disclosure.

Referring now to FIG. 3, a flowchart depicting an example method of detecting a refueling event is presented. Control may start with 304 when the ignition system of the vehicle is on (i.e., key ON). At 304, control determines whether the ignition system of the vehicle has transitioned to off (i.e., key OFF). If true, control continues with 308; if false, control may remain at 304.

At 308, control may initialize the timer value 228 and store the measured tank pressure 212 as the initial tank pressure. While not associated with the detection of a refueling event, control also stores the present fuel level 256 when the ignition system of the vehicle is turned off. Control updates the timer value 228 at 312 and continues with 316. The timer value 228 therefore tracks the period elapsed since the ignition system of the vehicle was turned off.

At 316, control determines whether the timer value 228 is greater than the predetermined value. If true, control may end; if false, control may continue with 320. Control may determine the delta tank pressure at 320. Control may set the delta tank pressure, for example, equal to the measured tank pressure 212 minus the initial tank pressure.

Control determines whether the delta tank pressure is greater than the predetermined amount (pressure) at 324. In other words, control determines whether the measured tank pressure 212 is greater than the initial tank pressure by at least the predetermined amount at 324. If true, control detects the occurrence of a refueling event and indicates that a refueling event has been detected at 328, and control may end. If false, control indicates that a refueling event has not been detected at 332 and control may return to 312. For example only, the predetermined amount may be approximately 4-5 inches of water or another suitable value.

Figure 4:
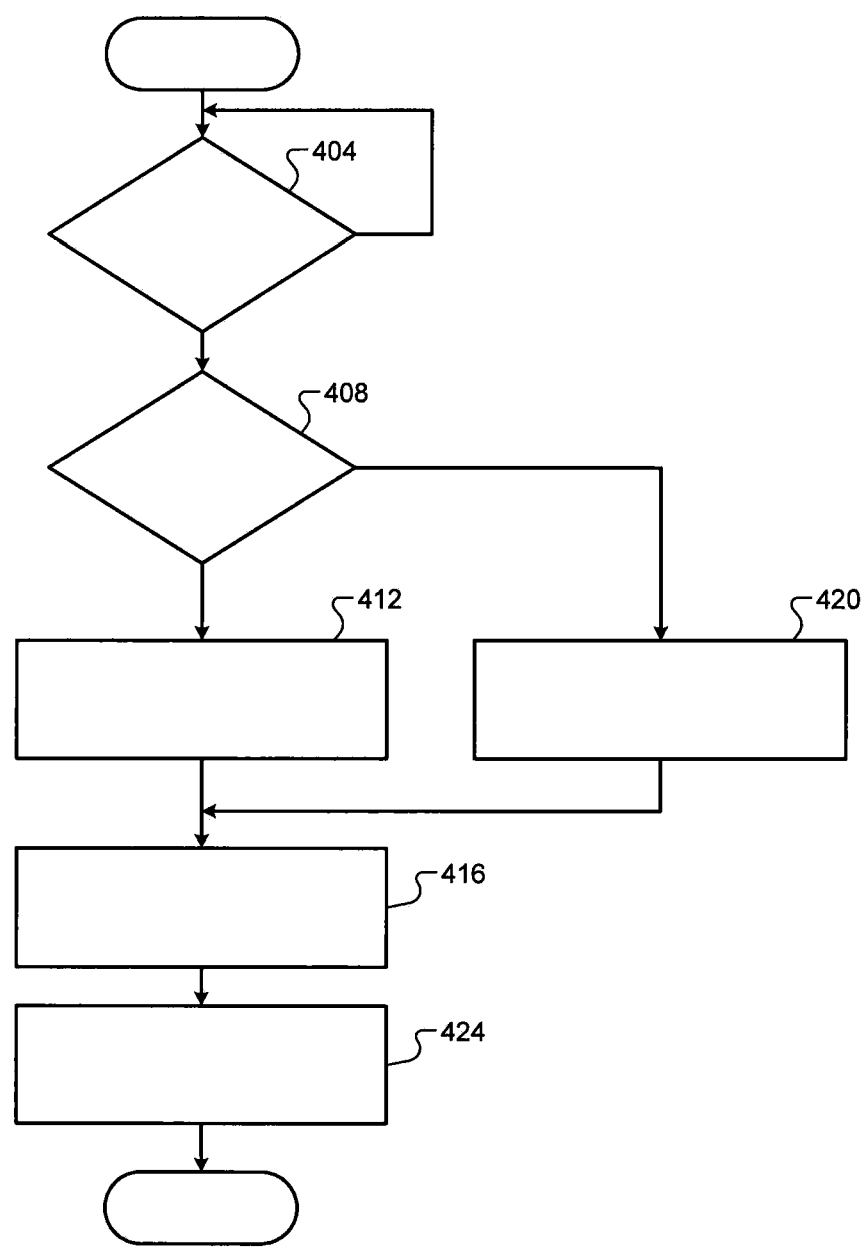
FIG. 4 is a flowchart depicting an example method of controlling a level of fuel displayed according to the present disclosure.

Referring now to FIG. 4, a flowchart depicting an example method of controlling the fuel level displayed via the fuel level gauge 154 is presented. Control may begin at 404 when the ignition system of the vehicle is off (i.e., key OFF). Control may determine whether the ignition system of the vehicle transitioned from off to on at 404 (i.e., key ON). If true, control may continue with 408; if false, control may remain at 404.

At 408, control may determine whether a refueling event was detected while the vehicle was shut down. If true, control may set the selected adjustment parameter 264 to the first adjustment parameter at 412 and continue with 416. If false, control may set the selected adjustment parameter 264 to the second adjustment parameter at 420 and continue with 416. In other words, control selects the one of the first and second adjustment parameters that allows the present fuel level 256 to be adjusted toward the measured fuel level 248 at the faster rate when a refueling event was detected. Conversely, control selects the one of the first and second adjustment that allows the present fuel level 256 to be adjusted toward the measured fuel level 248 at the slower rate when a refueling event was not detected. The refueling indicator 232 may be used as the indicator of whether a refueling event was detected.

Control may determine the present fuel level 256 based on the measured fuel level and the selected adjustment parameter 264 at 416. In various implementations, control may determine the present fuel level 256 based on a first-order lag filter, the measured fuel level 248, a last value of the present fuel level 256, and the selected adjustment parameter 264 (the selected filter coefficient). For example only, control may set the present fuel level 256 equal to the last value of the present fuel level 256 plus the product of the selected filter coefficient and the difference between the last value of the present fuel level 256 and the measured fuel level 248.

Control controls the fuel level displayed via the fuel level gauge 154 based on the present fuel level 256 at 424. More specifically, control may control the fuel level gauge 154 to display the present fuel level 256. While control is shown as ending after 424, control may instead perform 416 and 424 at a predetermined loop rate.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method for a vehicle, comprising:
   outputting a measured fuel level based on a fuel level signal generated by a fuel level sensor;
   after an ignition system of the vehicle is turned on, adjusting a present fuel level toward the measured fuel level based on a first rate when a refueling event was detected while the ignition system was off and adjusting the present fuel level toward the measured fuel level based on a second rate when a refueling event was not detected while the ignition system was off,
   wherein the first rate is faster than the second rate; and
   controlling a fuel level gauge to display the present fuel level.

2. The method of claim 1 further comprising setting the present fuel level using a filter based on the measured fuel level and a previous value of the present fuel level.

3. The method of claim 1 further comprising setting the present fuel level using a first-order filter based on the measured fuel level and a previous value of the present fuel level.

4. The method of claim 1 further comprising setting the present fuel level equal to a last value of the present fuel level plus a product of a coefficient and a difference between the measured fuel level and the last value,
   wherein the coefficient corresponds to one of the first and second rates.

5. The method of claim 1 wherein the fuel level gauge is one of a digital display and an electro-mechanical gauge.

6. The method of claim 1 further comprising:
   outputting a measured fuel tank pressure based on a tank pressure signal generated by a fuel tank pressure sensor; and
   selectively detecting the refueling event based on the measured fuel tank pressure.

7. The method of claim 6 further comprising selectively detecting the refueling event based on a first value of the measured fuel tank pressure stored when the ignition system of the vehicle is turned off and a second value of the measured fuel tank pressure output during a predetermined period after the ignition system of the vehicle is turned off.

8. The method of claim 7 further comprising selectively detecting the refueling event when the second value is greater than the first value.

9. The method of claim 7 further comprising detecting the refueling event when the second value is greater than the first value by at least a predetermined amount,
   wherein the predetermined amount is greater than zero.

* * * * *